Sept. 22, 1964 H. WAGNER ETAL 3,149,996

MAGNETIC RECORD MEMBER

Filed Nov. 14, 1961

INVENTORS:
HEBERT WAGNER
ERICH MERKEL

BY Marzall, Johnston, Cook, & Root ATT'YS

United States Patent Office 3,149,996

Patented Sept. 22, 1964

3,149,996

MAGNETIC RECORD MEMBER

Herbert Wagner and Erich Merkel, both of Ludwigshafen (Rhine), Germany, assignors to Badische Anilin- & Soda-Fabrik Aktiengesellschaft, Ludwigshafen (Rhine), Germany Filed Nov. 14, 1961, Ser. No. 152,173
Claims priority, application Germany Nov. 16, 1960
6 Claims. (Cl. 117—72)

Figure 1:
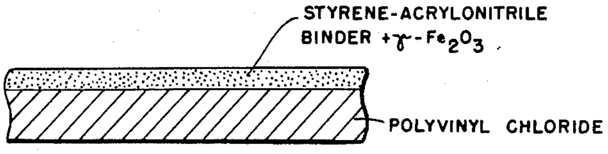

This invention relates to a magnetic record member comprising a tape as base or carrier and one or more layers applied thereto of a magnetizable substance incorporated in a binder. More particularly, the invention relates to a special binder adapted for use in making magnetic record members.

The active layer of magnetic record members, which consists of magnetizable substances finely dispersed in a binder, is in very close contact, during sound recording and reproduction, with the magnetic heads of the recording apparatus. For this reason, the active layer is subjected to heavy abrasion so that, after frequent sliding of the layer past the magnetic heads, the magnetic record member may become completely unfit for use and the narrow gap between the magnetic heads is fouled by the abraded particles. To avoid these disadvantages, the binder should have maximum resistance to abrasion.

Binders which have hitherto been used in the manufacture of magnetic record members are polyvinyl chloride, vinyl chloride copolymers, polyacrylates, polycarbonates, polyurethanes, and varnishes based on epoxy resins. The said binders, however, have various disadvantages. Thus, active layers comprising polyvinyl chloride or vinyl chloride copolymers as binder show heavy abrasion, especially when they are subjected to high stresses, such as are encountered, for example, in apparatus for recording television impulses. When polycondensation resins are used, considerable difficulties arise in coating the carrier tape because of the long drying periods or reaction periods required.

We have found that the said disadvantages are obviated by using as binder, in at least one layer applied to a plastic carrier tape and containing a magnetizable substance, a copolymer of 60 to 90% by weight, preferably 70 to 80% by weight, of styrene and 40 to 10% by weight, preferably 30 to 20% by weight, of acrylonitrile. The copolymer used as binder should have a K-value of 60 to 80, advantageously of 68 to 75.

The ratio of binder to magnetizable substance is advantageously from 1:2 to 1:7.

As compared with the prior art binders, the binder according to this invention is distinguished by several advantages. In particular, it has extremely high resistance to abrasion, which can be determined by the following method: A magnetic record member having the form of a tape and a certain degree of magnetization is run, at a certain contact pressure, past a surface 3 meters in length which has been roughened to a certain degree. The decrease in thickness of the active layer is then determined by electroacoustic measurement of the decrease in sensitivity.

The abrasion values for known binders and the abrasion value for the binder according to this invention are given in the following table. The various tests were carried out under the same conditions so that the results could be compared.

TABLE

| Binder used | Abrasion (microns) |
|---|---|
| Copolymer of vinyl chloride and vinyl acetate (1:1); K-value 58 | 2.6 |
| Copolymer of ethyl methacrylate and ethyl acrylate (1:1); K-value 60 | 1.8 |
| Binder according to this invention; K-value 73 | 1.0 |

Although the binder according to this invention has a much higher abrasion resistance than the known binders, magnetic record members coated with this binder are surprisingly far less abrasive to the magnetic heads of recording apparatus.

The results of three successive measurements of the abrasive action of magnetic record members coated with the binder according to this invention and with a copolymer of vinyl chloride and vinyl acetate, respectively, are given in the following table. The measurements are carried out as follows: A magnetic record member 1000 meters in length is run past a rod of tin solder at a contact pressure of 2500 g./cm.$^2$. The rod is weighed before and after the test, the difference in weight being a measure of the abrasion.

TABLE

| | Abrasion of rod (mg./1,000 meters of tape) | | |
|---|---|---|---|
| Measurement No. | I | II | III |
| Binder used: | | | |
| Binder according to this invention (78% styrene and 22% acrylonitrile); K-value 73 | 4.5 | 3.1 | 1.9 |
| Copolymer of vinyl chloride and vinyl acetate (1:1); K-value 58 | 15.6 | 8.5 | 7.8 |

A further advantage of the binder according to this invention over the prior art binders is to be seen in its better compatibility toward iron oxide pigments. The magnetizable pigments can be packed more closely in the new binder and are therefore also present in greater density in the dried layer. This results in increased magnetic sensitivity of magnetic record members provided with such a layer. The following table shows the obtainable pigment densities and the sensitivities of magnetic record members provided with an active layer comprising, respectively, the binder according to this invention and a prior art binder consisting of a copolymer of vinyl chloride and vinyl acetate.

TABLE

| Binder used | Pigment density (g./cm.$^3$) | Sensitivity (db) |
|---|---|---|
| Binder according to this invention (78% styrene and 22% acrylonitrile); K-value 73 | 1.59 | +2.6 |
| Copolymer of vinyl chloride and vinyl acetate (1:1); K-value 58 | 1.20 | −0.2 |

The sensitivity is given with reference to a comparison tape according to DIN (German Industrial Standard) 45, 513.

The abrasion resistance of the binder according to this invention is a multiple of that of the prior art binders. Surprisingly, however, magnetic record members comprising the binder according to this invention cause less abrasion of the magnetic heads of recording apparatus. In addition to having increased pigment compatibility, the binder according to the invention fulfills all the other demands made on a binding agent, for example power of adhesion to the carrier tape, especially to polyvinyl chloride tape, without any substratum being required. As compared with epoxy and polyurethane varnishes, the binder according to the invention has the advantage that, after the carrier has been coated, it is merely necessary to remove the solvent, so that long drying periods or high drying temperatures are not required.

If a plurality of superimposed magnetizable layers is employed, it is expedient to use the binder according to this invention only in the uppermost layer which comes into contact with the magnetic heads. Thus, for example, in the case of carriers to which the binder according to the invention does not adhere firmly enough, known binders which adhere without a substratum are used for the lower layer, and the styrene-acrylonitrile copolymer for the top layer. The superimposed layers may advantageously have different magnetic properties, which leads to optimum results in special recording methods.

The invention will be further illustrated by, but is not limited to, the following examples.

Figure 2:
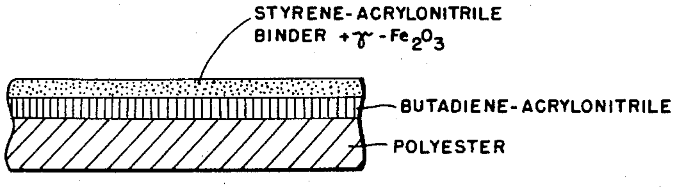
Figure 3:
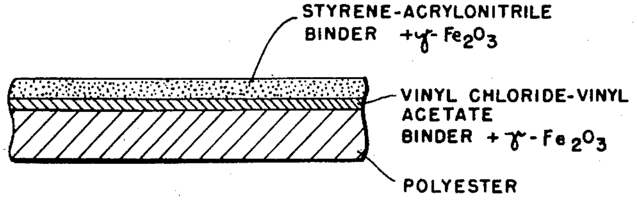

The accompanying drawing provides a cross-sectional illustration of various embodiments of a magnetic record member in accordance with the invention, FIGS. 1, 2 and 3 corresponding to Examples 1, 2 and 3, respectively.

*Example 1*

To a polyvinyl chloride tape there is applied a coating having a thickness of 13$\mu$ of a dispersion which is composed of:

6.0 kg. of $\gamma$-$Fe_2O_3$;
1.7 kg. of a copolymer of 72% styrene and 28% acrylonitrile having a K-value of 74;
14.2 kg. of a solvent consisting of a mixture of equal parts by volume of acetone, methyl ethyl ketone and benzene; and
0.1 kg. of an emulsifier consisting of a mixture of triethanolamine monooleic acid ester and the corresponding di- and tri-esters.

The abrasion value is 1.0$\mu$. The pigment density is 1.45 g./cm.$^3$.

*Example 2*

To a polyester tape there is applied a substratum having a thickness of 1$\mu$ of a copolymer of 60% butadiene and 40% acrylonitrile. In the same operation, a dispersion is then applied which is composed of:

6.0 kg. of $\gamma$-$Fe_2O_3$;
2.0 kg. of a copolymer of 78% styrene and 22% acrylonitrile having a K-value of 73;
15.5 kg. of a solvent consisting of a mixture of equal parts by volume of acetone, methyl ethyl ketone and benzene; and
0.1 kg. of an emulsifier consisting of a mixture of triethanolamine monooleic acid ester and the corresponding di- and tri-esters.

The abrasion value is 0.7$\mu$. The pigment density is 1.53 g./cm.$^3$.

*Example 3*

To a polyester tape there is applied a coating having a thickness of 5 to 6$\mu$ of a dispersion which is not magnetically oriented and is composed of:

6.0 kg. of magnetic pigment;
2.0 kg. of a copolymer of vinyl chloride and vinyl acetate (1:1) having a K-value of 58;
15.5 kg. of a solvent consisting of a mixture of equal parts by volume of acetone, methyl ethyl ketone and benzene; and
0.1 kg. of an emulsifier consisting of a mixture of triethanolamine monooleic acid ester and the corresponding di- and tri-esters.

In a further operation, there is applied a second coating having a thickness of 6$\mu$ of a dispersion whose magnetizable particles are oriented in conventional manner by means of a directing magnet and which is composed of:

6.0 kg. of magnetic iron oxide;
2.0 kg. of a copolymer of 78% styrene and 22% acrylonitrile having a K-value of 73;
15.5 kg. of a solvent consisting of a mixture of equal parts by volume of acetone, methyl ethyl ketone and benzene; and
0.1 kg. of an emulsifier consisting of a mixture of triethanolamine monooleic acid ester and the corresponding di- and tri-esters.

The abrasion value is 1.0$\mu$. The pigment density is 1.59 g./cm.$^3$.

What we claim is:

1. A magnetic record member comprising a plastic carrier tape and at least one layer applied thereto containing a magnetizable substance incorporated in a binder, wherein at least in the uppermost layer the binder is a copolymer of 60 to 90% by weight of styrene and 40 to 10% by weight of acrylonitrile, the ratio between said binder and said magnetizable substance being from 1:2 to 1:7.

2. A magnetic record member as claimed in claim 1, wherein said binder is a copolymer of 70 to 80% by weight of styrene and 30 to 20% by weight of acrylonitrile.

3. A magnetic record member as claimed in claim 1, wherein said copolymer of styrene and acrylonitrile has a K-value of 60 to 80.

4. A magnetic record member as claimed in claim 1, wherein said copolymer of styrene and acrylonitrile has a K-value of 68 to 75.

5. A magnetic record member as claimed in claim 1, wherein said plastic carrier tape comprises a base layer and an additional layer of binder which is free of magnetizable substance and which is adherent to both said base layer and the next upper layer of binder containing said magnetizable substance.

6. A magnetic record member as claimed in claim 5, wherein said base layer is a polyester and said additional layer is a copolymer of butadiene and acrylonitrile.

References Cited in the file of this patent

UNITED STATES PATENTS

| | | |
|---|---|---|
| 2,525,601 | Howell | Oct. 10, 1950 |
| 2,862,845 | Szegvari | Dec. 2, 1958 |
| 2,989,415 | Horton et al. | June 20, 1961 |